(12) United States Patent
Prueitt

(10) Patent No.: US 6,223,743 B1
(45) Date of Patent: May 1, 2001

(54) SOLAR POWER GENERATION AND ENERGY STORAGE SYSTEM

(76) Inventor: Melvin L. Prueitt, 161 Cascabel, Los Alamos, NM (US) 87544

( * ) Notice: Subject to any disclaimer, the term of this patent is extended or adjusted under 35 U.S.C. 154(b) by 0 days.

(21) Appl. No.: 09/396,653

(22) Filed: Sep. 15, 1999

Related U.S. Application Data

(60) Provisional application No. 60/134,642, filed on May 18, 1999.

(51) Int. Cl.⁷ .................................. F24J 2/34; F24J 2/36
(52) U.S. Cl. ........................................... 126/620; 126/626
(58) Field of Search .................... 126/620, 624, 126/626, 565, 566, 569, 651, 655, 908

(56) References Cited

U.S. PATENT DOCUMENTS

| | | |
|---|---|---|
| 3,174,915 | 3/1965 | Edlin . |
| 3,991,742 | 11/1976 | Gerber . |
| 4,036,209 | 7/1977 | Press . |
| 4,038,967 | 8/1977 | Stout et al. . |
| 4,048,980 * | 9/1977 | Googin et al. ...................... 126/907 |
| 4,312,915 * | 1/1982 | Fan ...................................... 126/569 |
| 4,396,643 * | 8/1983 | Kuehn et al. ........................ 126/908 |
| 4,426,995 * | 1/1984 | Wilson ................................ 126/566 |
| 4,521,442 * | 6/1985 | Guarnieri ............................ 126/908 |
| 4,559,924 | 12/1985 | Wilhelm . |
| 4,582,764 * | 4/1986 | Allerd et al. ........................ 126/908 |
| 4,597,378 | 7/1986 | Smith . |

FOREIGN PATENT DOCUMENTS

| | | | |
|---|---|---|---|
| 2335804 * | 10/1982 | (FR) | .................................... 126/626 |
| 2504660 * | 10/1982 | (FR) | .................................... 126/620 |
| 79/00225 * | 5/1979 | (WO) | .................................... 126/624 |

OTHER PUBLICATIONS

Wilhelm et al., "The Development of Polymer Film Solar Collectors: A Status Report," BNL 51582 Aug. 1992.

* cited by examiner

Primary Examiner—Ira S. Lazarus
Assistant Examiner—Sara Clarke

(57) ABSTRACT

A solar energy collection system harvests solar energy from large open areas. A length of flexible solar collector is provided for unrolling along a supporting surface. A first layer of the solar collector is an uninsulated base panel for directly contacting the ground or other supporting structure. A plurality of parallel conduits are sealed along the length of the flexible base panel and have a high light absorption and a low infrared emission for containing a flowing liquid to be heated by solar energy from the sun. A length of a covering material is placed parallel to the base panel and between the parallel conduits and the sun and sealed to the base panel for containing a low pressure fluid to reduce heat loss from the flowing liquid and to inflate the structure formed by the ground cover and covering material. Heated fluid from the parallel conduits is collected in a header for delivery to a power generating system. The heated liquid is passed through a boiler for boiling a fluid with a low boiling point, such as a refrigerant, and the vapor can then be used in a conventional power plant for generating output energy. In one embodiment, the power plant condenser is cooled by the evaporation of water sprayed into cooling air adjacent the condenser.

6 Claims, 5 Drawing Sheets

SOLAR POWER GENERATION AND ENERGY STORAGE SYSTEM

RELATED APPLICATIONS

This application claims the benefit of U.S. Provisional Application Ser. No. 60/134,642, filed May 18, 1999.

FIELD OF THE INVENTION

The present invention relates generally to production of thermal energy from solar energy, and, more particularly, to a system for collecting, storing, and using thermal energy generated from incident solar energy.

BACKGROUND OF THE INVENTION

The amount of energy striking the earth from the sun in just one day is enough to provide electric power for the human race for 175 years at the present rate of consumption. One way to gather some of this energy is through photovoltaic panels; but they turn off when the sun goes down. Furthermore, available photovoltaic panels are expensive compared to the cost of electric power produced by fossil fuels.

Another way to harvest solar energy is to concentrate sunlight with parabolic mirrors to produce steam in a Rankine cycle that generates electric power. But, again, this technique is expensive and labor intensive and is useful only during relatively dear daylight hours. Projects that propose the use of flat panel collectors for the conversion of solar energy to thermal energy for the production of output power have proven uneconomical due to the cost of constructing large areas of collector surfaces. Both of the methods also require some external form of energy storage in order to continue to produce power at night.

Flat solar panels normally are formed in rectangular boxes with one or two layers of glazing above the absorbing surface, and the sidewalls that support the glazing cast shadows on the absorbing surface in early morning and late afternoon. Furthermore, the frames of the boxes provide heat paths, which lose energy from the solar collectors to the ambient air.

What is needed is a system that inexpensively harvests solar energy over large areas, using part of the energy to produce power during the daytime and storing the rest of the energy for nighttime power generation. For example, Brookhaven National Laboratory Report BNL 51482, UC-59c, "The Development of Polymer Film Solar Collectors: A Status Report," W. G. Wilhelm et al., August 1982, describes a solar collector consisting of plastic films that are sealed together at appropriate places by a roller system in a factory. The rolls of plastic film are then cut into sections and mounted into rigid frames. Bottom insulation is applied to reduce heat loss.

A number of patents show the construction of solar panels that consist of plastic films for glazing and for channels containing a heat collecting fluid. U.S. Pat. Nos. 4,038,967, 4,559,924, and 4,597,378 show plastic films sealed together for the transport of heat collecting fluids and plastic films for glazing. In these cases, rigid frameworks are required to support the films and insulation is provided to prevent heat loss below the panels.

U.S. Pat. No. 4,036,209 shows a water channel with walls of plastic and a plastic glazing supported by air pressure. It is attached to a rigid structure and is not designed to cover large areas over the ground. U.S. Pat. No. 3,174,915 is a solar still that uses an air-inflated cover for glazing and for condensate collection. It is attached to a rigid framework. U.S. Pat. No. 3,991,742 describes a water-heater solar panel consisting of two plastic films between which water flows. This system is designed to be attached to a pitched roof to provide the necessary gravity fluid flow.

The present invention, Solar Power and Energy Storage System (SPAESS), provides a solar energy harvest system that can be applied over large ground areas to economically produce electric power from the sun during the daylight and store energy in the underlying earth for nighttime power generation. A square mile (640 acres) of solar harvest can output over a hundred megawatts of power during peak demand in the daytime and continue to generate energy at relatively high levels during the night when the demand for electricity has decreased.

Various objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The present invention is directed to a solar energy collection system for harvesting solar energy from large open areas. A length of solar collectors having a flexible uninsulated base panel is provided for unrolling along a supporting surface. A plurality of parallel conduits are sealed along the length of the flexible base panel and have a high light absorption and a low infrared emission for containing a flowing liquid to be heated by solar energy from the sun. A length of a covering material is placed parallel to the base panel and between the parallel conduits and the sun and sealed to the base panel for containing a low pressure fluid to reduce heat loss from the flowing liquid and to inflate the structure formed by the ground cover and covering material.

Heated fluid from the parallel conduits is collected in a header for delivery to a power generating system. The heated liquid is passed through a boiler for boiling a fluid with a low boiling point, such as a refrigerant, and the vapor can then be used in a conventional power plant for generating output energy. In one embodiment, the power plant condenser is cooled by the evaporation of water sprayed into cooling air adjacent the condenser.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION

SPAESS is designed to harvest and store solar energy over large ground areas that may be measured in square miles. Accordingly, the solar collector panels are designed for continuous fabrication and installation by using multi-layers of plastic films that are laminated together by adhesive, heat, pressure, or other continuous process where rolls of plastic are fed in parallel to rollers that guide and seal the layers at appropriate locations. These solar collector panels can then be simply wound in large rolls for transportation to the installation site and then unrolled over the ground.

Figure 1:
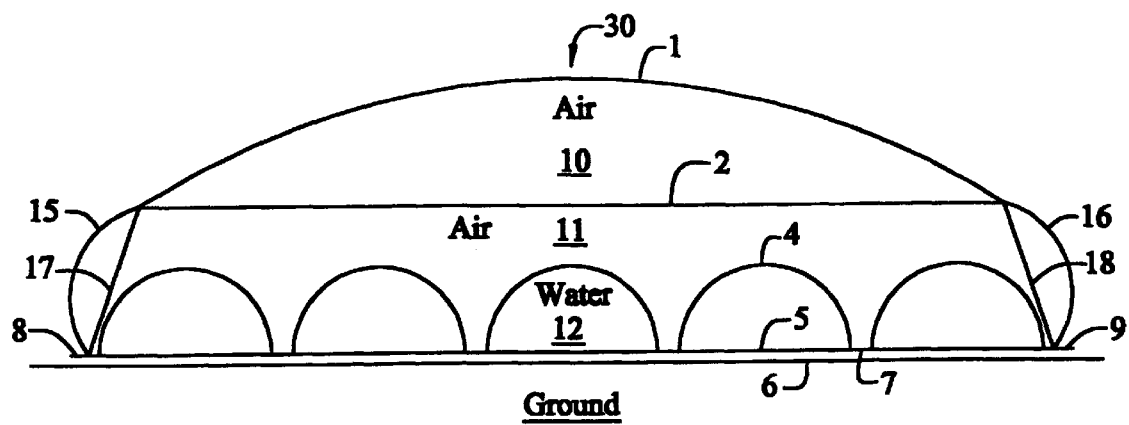
FIG. 1 is a cross-section of an exemplary section of solar energy collector according to one embodiment of the present invention.

One embodiment of such a fabricated solar collector panel 30 is shown in cross-section in FIG. 1 in an inflated operational state. Outer layer 1 is preferably formed of a tough plastic film, such as Tedlar and the like, having a high coefficient of visible light transmission and low coefficient of infrared light transmission so that heat is not transmitted back through outer layer 1. Outer layer 1 must be generally unharmed by ultraviolet light since it will be continuously exposed to ultraviolet radiation during daylight hours.

Layer 2 may be provided to create an insulating air space 10 between layers 1 and 2. Layer 2 also has a high coefficient of visible light transmission and low coefficient of infrared light transmission. Layer 2 may not be required for some applications. In yet other applications additional insulation may be needed and other air space insulation volumes can be formed by additional layers similar to layer 2.

Layer 4 forms the channels 12 for the circulating fluid, generally water, that absorbs the incoming solar energy and circulates to an energy generating system, described below. Layer 4 also has a high coefficient of visible light absorption and a low coefficient of infrared light emission. Layer 4 may also obtain the appropriate light absorption and emission characteristics using suitable coatings, such as black chromium.

Layer 5 is the ground contact base layer and is formed of a plastic that can withstand abrasion and punctures from objects on the ground, such as Tedlar and the like. Base layer 5 preferably has a relatively high coefficient of thermal conductivity to assist in heat transfer to the ground for energy storage.

In an operating conditioning, layer 1 is supported by a slight air pressure in air space 10. Layer 2 is held in position by the tension created by inflated layer 1. However, if the tension is not sufficient to support layer 2, air pressure in air space 11 will support layer 2 where the air pressure in space 11 is slightly greater than the air pressure in space 10. Generally, the air pressures in spaces 10 and 11 are substantially the same.

In addition, side surfaces 15 and 16 are formed to bulge out slightly during operation. In this manner, abutting surfaces 15 and 16 from adjacent solar panels will act to contact one another so that a seal is formed that prevents heat loss from the ground along the solar panel sides. Members 17 and 18 are tension members that connect layer 1 to layer 5 so that sides 15 and 16 protrude outwardly in order to mate with and seal along sides 15 and 16 of adjacent flexible solar panels Layers 4 and 5 are sealed together along strips 7. All of the layer assemblies are then sealed along strips 8 and 9, which are simply sealed extensions of layer 4 and 5. Thus, a sealed solar panel of plastic films is formed for the collection, transmission, and storage of solar energy. The seals may be formed by thermal sealing or by using suitable adhesives.

Water, or other suitable solar energy absorbing fluid, flows through channels 12 and is heated by the sunlight transmitted through layers 1 and 2 and absorbed on layer 4. The fluid in channels 12 stores the solar energy and is circulated to transfer the energy to a power plant or other devices that can use the energy stored in the circulating fluid. By having the channels that are relatively thick, e.g., 10 cm, a large heat storage reservoir is provided by the fluid. Part of the heat in the fluid is transferred by conduction into ground 6, or other adjacent surface, and is stored there during times of incident sunshine. When the temperature of the fluid in channels 12 is less than the temperature of the underlying ground 6, such as at night, heat is transferred by conduction from ground 6 into the circulating fluid. That is, ground 6 and the fluid in channels 12 become a heat storage system. In conventional solar panel systems, the bottom of the panel is insulated to prevent loss. Here, heat conduction is provided in the system between solar panels 30 and ground 6 or other adjacent surface.

For a typical soil, about 90% of the useful ground energy storage takes place in the top 15 cm (6 inches) of the soil. Since the ground is not a good heat conductor, soil below this level has small effect on heat storage. Over a period of time, the soil below this level increases in temperature to approximately represent the average temperature of the soil above it.

A particular advantage in using the ground for heat storage is that insulation is not needed on the bottom of the panel. If insulation were required on the bottom of the panel and if the insulation were installed with the panels, it would be difficult to wrap long panels onto reasonable size rolls for ready distribution over a large surface area.

Figure 2:
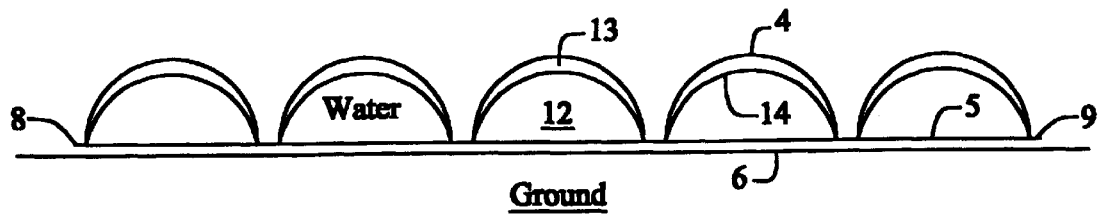
FIG. 2 is a cross section of an alternate embodiment of a fluid flow system of the collector shown in FIG. 1.

FIG. 2 shows in cross-section an alternate embodiment of layers 4 and 5 with the addition of layer 14 to form additional channel 13 with layer 4. The circulating fluid flows in channels 12 and 13 during daylight hours. Sunlight impinging on layer 4 heats the fluid in channel 13. Since the fluid is flowing, turbulent mixing of the fluid causes the transfer of heat from channel 13 into the fluid in channel 12 and into ground 6. At night, the fluid in channel 13 is drained and replaced by air to increase the insulation between 12 and the environment. Surface 14 would radiate heat, but the radiant heat will be reflected back into the fluid in channel 12 if layer 4 reflects infrared radiation.

In another aspect, the flow of fluid in channel 13 can simply be stopped. This would reduce heat transfer from the fluid since a stagnant fluid has a lower heat transfer than turbulent flowing fluid.

To form a large solar array, the ground is first cleared of obstacles, e.g., by using a grader, and the solar panels are simply rolled out on the ground for distances that might exceed 100 meters and be connected to headers on one end that supply fluid and air and on the other end connected to headers that receive the heated fluid. The solar panels are placed adjacent each other so that heat is not lost from the ground between panels. The panels are held in place on the ground by the weight of fluid in channels 12.

Figure 3:
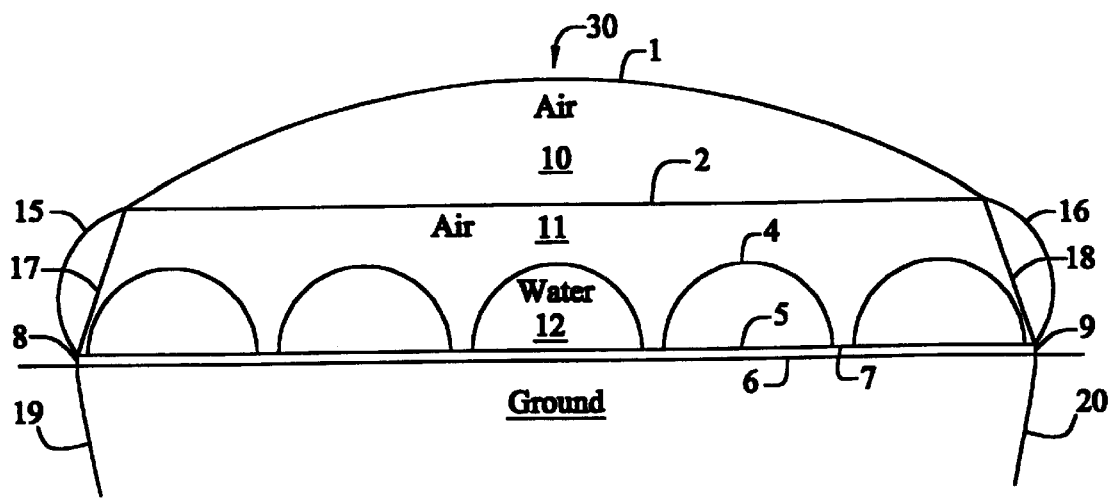
FIG. 3 is another embodiment of the solar energy collector shown in FIG. 1.

FIG. 3 illustrates another embodiment of solar collector 30 shown in FIG. 1. Layer 5 is extended beyond sealing points 8 and 9 to form flaps 19 and 20, which act to hold solar collector 30 in place. To install solar collector 30 with flaps 19 and 20, the roll that contains collector is unreeled from the back of a tractor, or the like, that has two plows that open trenches in the soil and place the soil to the outside. A mechanical guide then place flaps 19 and 20 into these trenches opened by the plow. A subsequent blade then moves the soil to fill the trenches and a roller can then compact the soil. Flaps 19 and 20 are then anchored to the ground so that the panels will remain in place whether or not they are filled with fluid.

Figure 4:
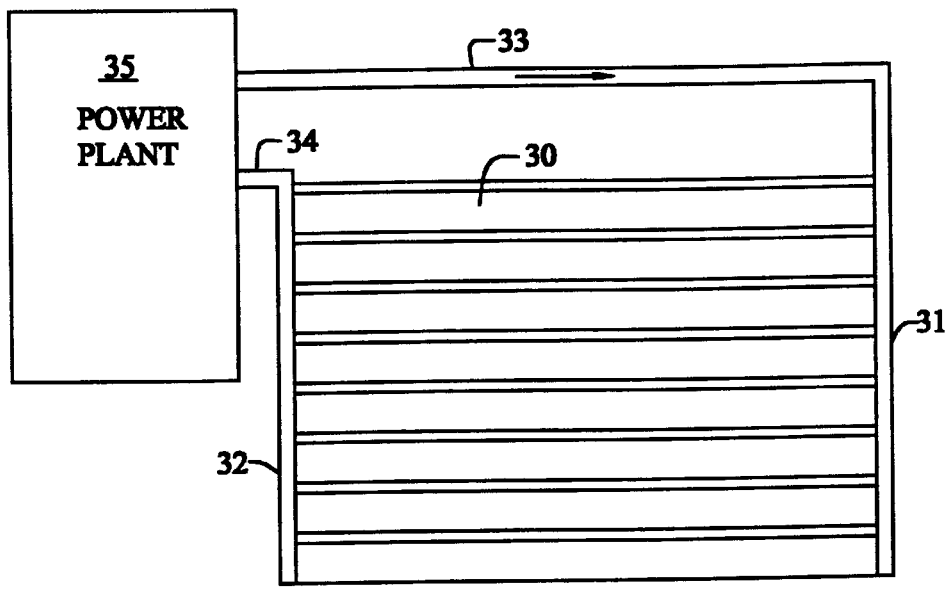
FIG. 4 is a schematic illustration of a power generating system using the solar energy collectors shown in FIG. 1.

FIG. 4 illustrates a top view of a power generating system according to the present invention where solar panels 30 are connected to headers 31 and 32. Fluid and air flow through distribution pipe 33 to header 31 for distribution to panels 30. The circulating fluids are collected in header 32 and return through conduit 34 to power plant 35.

Figure 5:
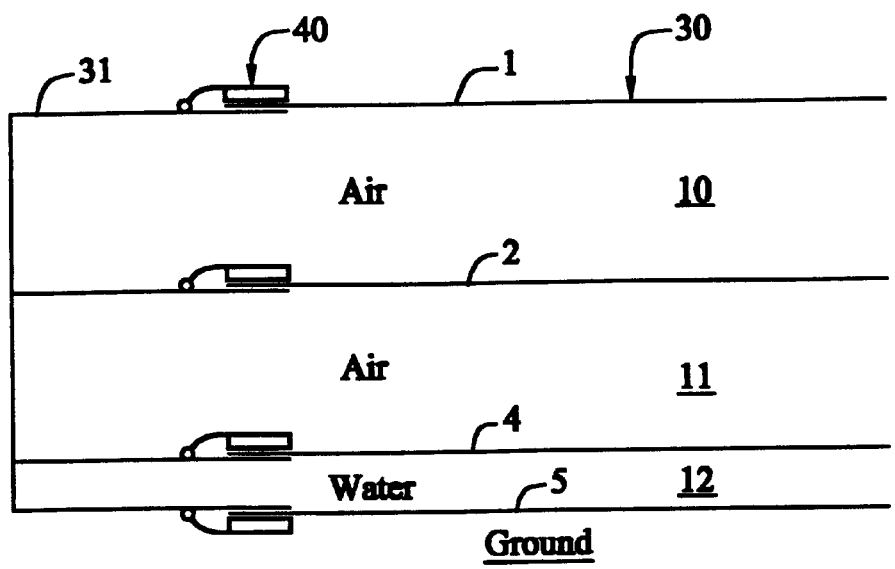
FIG. 5 is a schematic of a manifold system for delivering fluids to the various layers of the collector shown in FIG. 1.

Solar collectors 30 may be attached to headers 31 and 32 in a variety of ways as are well known to persons skilled in this art. FIG. 5 illustrates a cross-sectional side view of one possible configuration of a header 31 connected to collector 30 having the fluid channels shown in FIG. 1. After each layer is consecutively placed against the appropriate surface of header 31, snaps 40 with appropriate seals are pressed against the layers to firmly hold and seal the surfaces together. If it is not necessary to provide higher air pressure in channel 11 than in channel 10, the corresponding connector in header 31 can be eliminated. If the configuration shown in FIG. 2 is used, an additional connection and channel needs to be provided in the header. Header 31 can be constructed of a rigid or a flexible material. A flexible header may be advantageous in some circumstances since it can more easily conform to the underlying terrain.

Prior art solar panels typically had flat glazing, either glass or plastic. When placed horizontally, these panels tended to gather dust, hail, rain, and snow. With the design of the present invention, hail simply bounces off the tough inflated top layer. Rain washes off accumulated dust. Snow would tend to slide off the curved surface and/to melt during sunlight hours.

Other solar energy systems also require the construction of foundations and anchoring methods with much labor involved with each square meter of collector. With the present system, after the land is cleared of brush and smoothed, the panels are merely rolled out and connected to the end headers, which can be far apart. The weight of the circulating fluid anchors the panels to the ground, or other surface. In a back-up system, stakes can be driven periodically along the edges of the panels and straps secured across the tops of the panels to the stakes. This would prevent the panels from being blown away by the wind in case the panels were drained.

Figure 6:
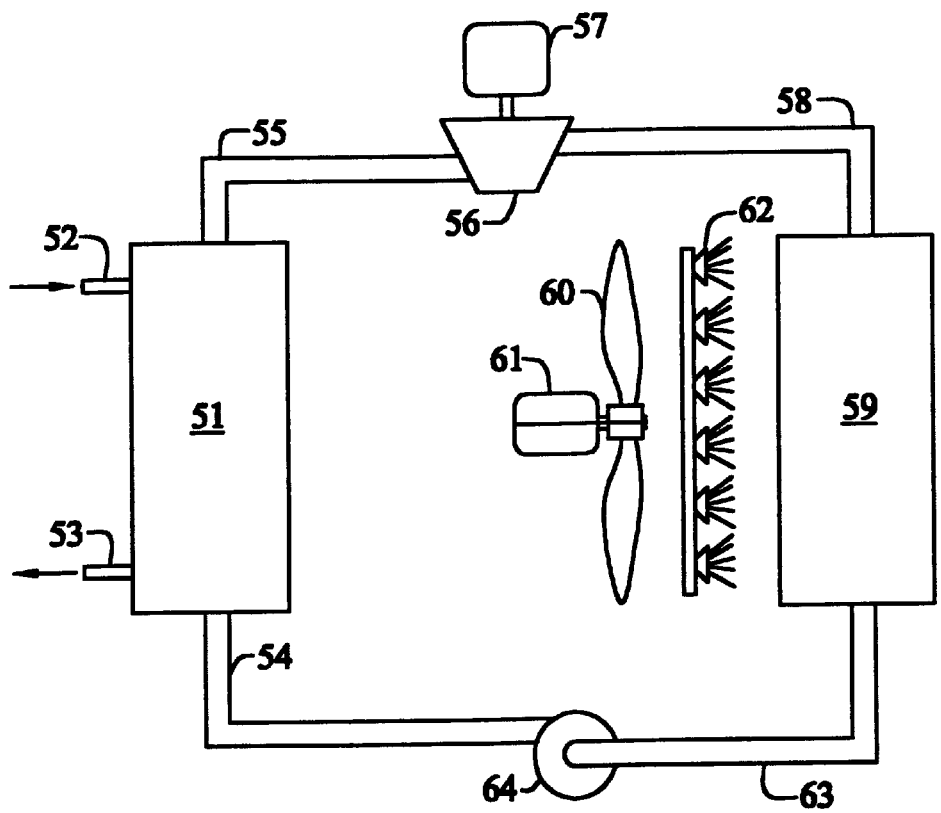
FIG. 6 is a schematic of a Rankine cycle power generating plant using the energy collected by the collector shown in FIG. 1.

FIG. 6 schematically illustrates one embodiment of a power plant. Heated fluid enters through pipe 52 and flows through heat exchanger 51 where it boils a low-boiling point liquid, such as a refrigerant. The fluid then exits through pipe 53. The vapor from boiler 51 flows through pipe 55, through turbine 56, which powers generator 57. Expanded exhaust vapor from turbine 56 flows through pipe 58 into condenser 59, which could be a finned tube heat exchanger where the vapor condenses to a liquid in the tubes. Fan 60, driven by motor 61, blows air through a water sprayer system 62 to cool the air by evaporation. The water spray also impinges on the fins of condenser 59 and continues to evaporate as it removes heat from condenser 59. Alternatively, a conventional water shell and tube condenser could also be used, or, if water is not readily available, air could be blown through a finned tube condenser. The condensed liquid flows through pipe 63 to pump 64, which pumps the liquid back through pipe 54 to boiler 51 to complete the cycle.

Figure 7:
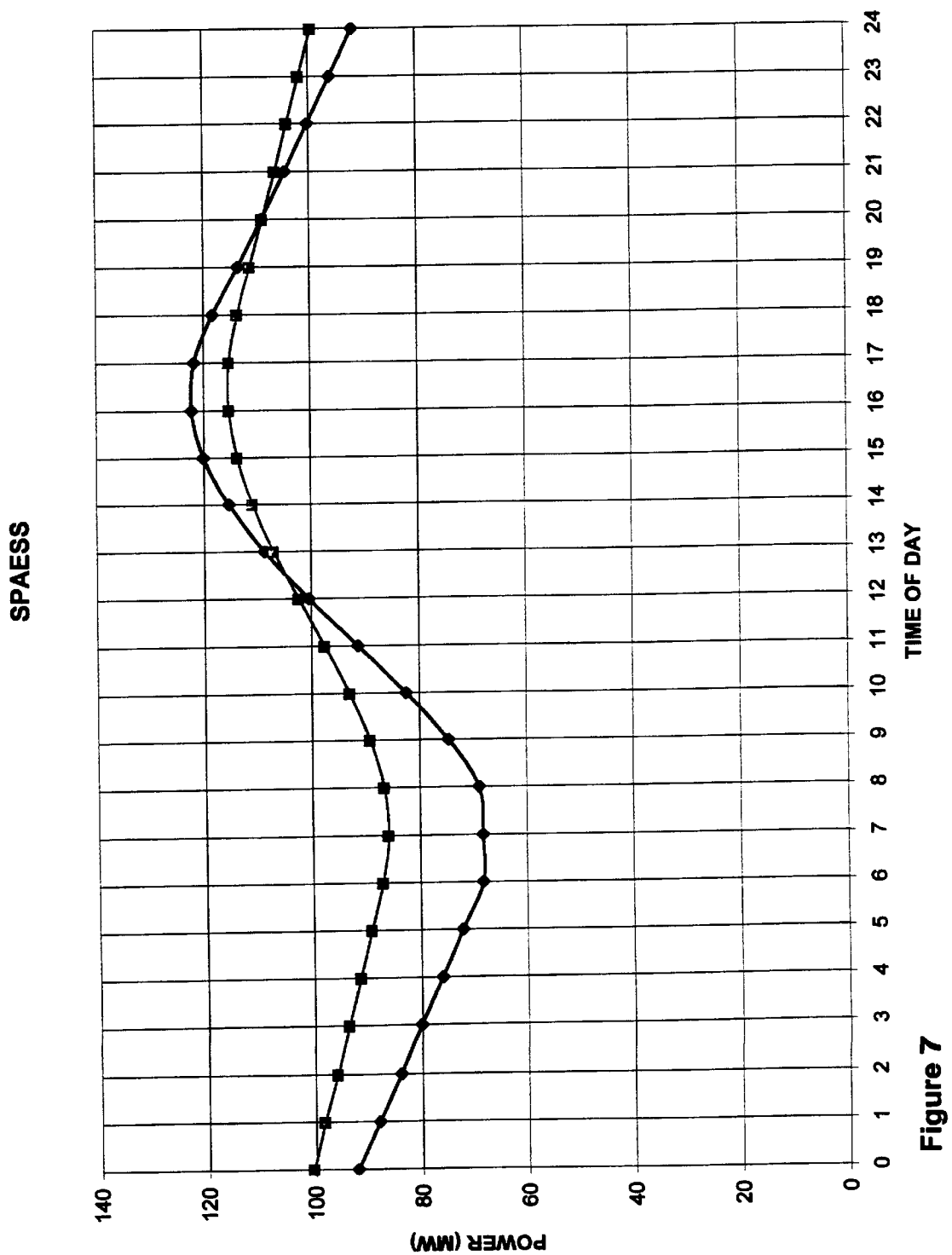
FIG. 7 graphically depicts the calculated power output from a system according to the present invention over a square mile during a day with 12 hours of sunshine.

FIG. 7 graphically depicts the calculated power output from a square-mile collector for a 24 hour period starting at midnight. This assumes a location with a relatively southern latitude and 12 hours of sunshine. The two curves represent two different flow rates. One flow rate provides higher power output during the day and less at night, while the second flow rate provides a more even output for the 24 hours.

During the wintertime, the days will have less sunshine, and the angle of incidence will be lower, so that less power is output. In the summer, when the sunlight duration is longer than 12 hours, the energy output will be greater than shown in FIG. 6.

Since the power plant uses water evaporation for condenser cooling, the efficiency is highest when the humidity is lowest. Efficiency is still good when humidity is high. For example, the plant efficiency is about 85–90% as efficient at 70% relative humidity as it is at 20% relative humidity. That is, if the plant produces 120 MW of power at 20% relative humidity, it would produce about 100 MW at 70% relative humidity. Thus, SPAESS would continue to work well in countries with high humidity. Places like Florida, Spain, and Malaysia, which have high humidity but lots of sunshine, would be good location for SPAESS. Preferred locations are deserts near seawater or other water source.

If the plant is using only air as a condenser coolant, the efficiency would be only about 75% as efficient as it would be with a water spray cooled condenser at a relative humidity of 20%.

Figure 8:
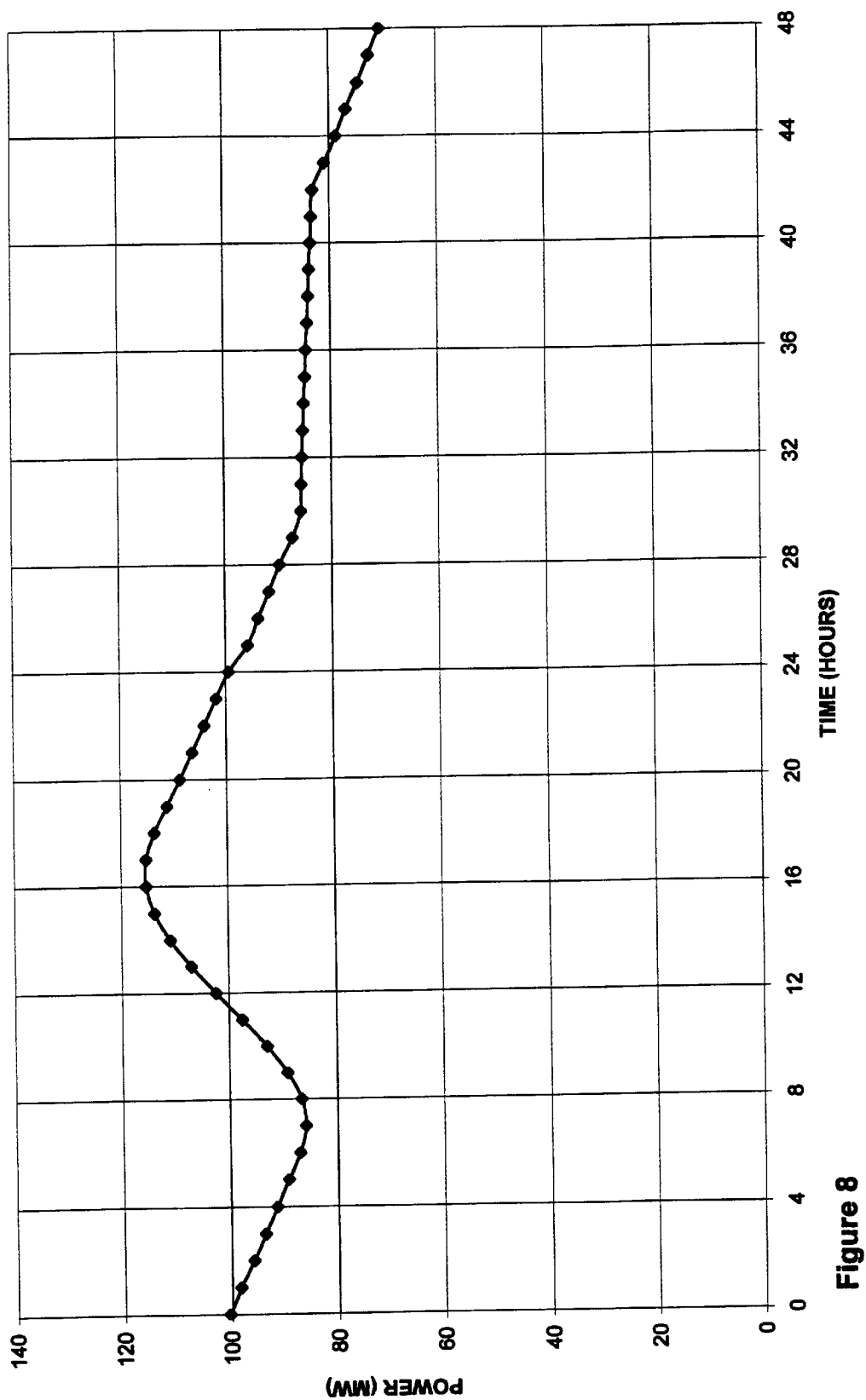
FIG. 8 graphically depicts the calculated performance of the plant depicted in FIG. 7 for a sunlit day followed by a cloudy day.

As shown in FIG. 8, SPAESS continues to function on cloudy days, but at a lower power level. Output power continues to be generated at a reduced power level, although the rate of decrease is small throughout the daylight hours. It should be noted that solar systems that use focussed sunlight from large mirror arrays, or cylindrical or parabolic dish systems do not work on cloudy days since they cannot focus diffuse light. SPAESS, like other flat collectors, can capture much of the energy of diffuse light through a cloud cover.

By way of illustration, an area of land 65 by 65 miles, e.g., a small spot in a corner of Arizona, could supply all of the electric power for the United States if SPAESS plants covered the area. Of course, instead of having a rectangular block, the system would likely be broken into smaller systems. With very large blocks, water runoff during rainstorms is a problem. Since the energy-acquisition system covers the land, the water runs off rather than soaking into the ground. In desert area where water is scarce, this runoff could be useful. It could be channeled into ponds that provide irrigation water to adjacent farm land.

Baja, Calif., offers an excellent location for SPAESS since it has abundant sunshine and water. Southern U.S., Mexico, Australia, the Middle East, India, Africa, Southern Europe, and areas of South America are immediate choices for SPAESS.

The above discussion was centered on large power plants, since the SPAESS design lends itself well to covering large areas economically. However, it can be adapted for small units. In fact, the first commercial units will likely be for self-generation at businesses. An acre of farmland could produce 140 kW of power during the day or a million kilowatt hours per year in a sunny area. This would be worth $50,000 per year at a "green rate" of 5 cents per kilowatt hour.

When one flies over many cities, one becomes aware of "square miles" of warehouses that lie on the edges of the metropolitan areas. Many of these flat-roofed buildings could support a one-megawatt SPAESS unit, more than enough to supply the power for the building. Excess power could then be sold to the utility company.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A solar energy collector system comprising:
    a length of flexible uninsulated base layer for unrolling along a supporting surface to form a plurality of adjacent solar collectors;
    a plurality of parallel channels sealed along the length of the flexible base layer and having a coefficient of light absorption for heating by solar energy a flowing liquid contained within the parallel channels and an infrared light emission coefficient effective to retain heat within the flowing liquid where heat is transmitted through the uninsulated base layer to the supporting surface for storage; and
    an outer layer between the parallel channels and the sun and sealed to the base layer for transmitting light to the parallel channels and containing a fluid to reduce heat loss from the flowing liquid and to inflate the structure formed by the base layer and outer layer.

2. A solar energy collection system according to claim 1 further including side surfaces along outer ones of the plurality of the parallel channels for sealing between abutting side surfaces of adjacent solar collectors.

3. A solar energy collection system according to claim 1 further including anchoring flaps extending from edge portions of the base layer to anchor the plurality of solar collectors.

4. A solar energy collection system according to claim 1, further including a plurality of cover layers, each cover layer covering one parallel channel and defining a space between the parallel channel and the cover layer for flowing additional liquid for heating or an insulating fluid for retarding transmission of heat from the liquid in the parallel channel.

5. A solar energy collection system according to claim 1, further including an intermediate layer between the parallel channels and the outer layer and connected to the outer layer and the side surfaces to form an intermediate insulating volume between the plurality of parallel channels and the outer layer.

6. A solar energy collection system according to claim 5, further including a plurality of cover layers, each cover layer covering one parallel channel and defining a space between the parallel channel and the cover layer for flowing additional liquid for heating or an insulating fluid for retarding transmission of heat from the liquid in the parallel channel.

* * * * *